United States Patent

Theodoulou

[15] 3,660,598

[45] May 2, 1972

[54] DC REGULATING BLANKING INSERTION CIRCUIT AND COLOR MATRIX CIRCUIT

[72] Inventor: Sotos M. Theodoulou, Toronto, Ontario, Canada

[73] Assignee: Clairtone Sound Corporation Limited, Rexdale, Ontario, Canada

[22] Filed: May 18, 1970

[21] Appl. No.: 38,376

[30] Foreign Application Priority Data

May 12, 1970 Canada ....................................082,511

[52] U.S. Cl. ................178/5.4 SD, 178/5.4 MA, 178/5.4 TE, 178/7.3 DC, 325/407, 328/175, 329/131, 329/168, 329/169

[51] Int. Cl. ......................H04n 9/50, H03b 3/02, H04b 1/16

[58] Field of Search .......................328/175; 330/11, 96, 127; 329/131, 168, 169, 189; 325/326, 407; 307/264; 178/7.3 DC, 7.5 DC, 5.4 SD, 5.4 TE, 5.4 MA

[56] References Cited

UNITED STATES PATENTS 3,207,998 9/1965 Corney et al. .....................178/7.3 DC 3,429,987 2/1969 Altmann ..........................178/5.4 MA

*Primary Examiner*—Benedict V. Safourek
*Assistant Examiner*—George G. Stellar
*Attorney*—Rogers, Breskin & Parr

[57] ABSTRACT

In a color television set, blanking pulses are superimposed on the supply voltage to the color demodulator, resulting in blanking pulses at the color difference outputs. The DC level at the tips of the blanking pulses at the outputs is detected and used to control the supply voltage, to regulate the quiescent DC level at the outputs to a known value. The color demodulator outputs feed drive amplifiers connected to the electron guns of the set. Adjustable tracking resistors feed the Y signal to the drive amplifiers, and since the potentials in the drive amplifiers are accurately known when no signal is present (because of the regulated bias supplied from the color demodulator), a service switch is provided to establish a reference potential which in effect cancels the effects of the tracking resistors when the guns are to be adjusted for coincident cutoff. Hence the guns can be adjusted for coincident cutoff with the tracking resistors rendered ineffective, and then the reference potential is removed and the tracking resistors are adjusted for grey tracking, the two adjustments having no effect on each other.

11 Claims, 3 Drawing Figures

Patented May 2, 1972 3,660,598

2 Sheets-Sheet 1

(μA737E)

*INVENTOR.*
SOTOS M. THEODOULOU

*BY*

Rogers, Bereskin & Parr

INVENTOR.
SOTOS M. THEODOULOU
BY
Rogers, Bereskin & Parr

DC REGULATING BLANKING INSERTION CIRCUIT AND COLOR MATRIX CIRCUIT

This invention relates to a DC level regulating and pulse transmitting circuit which is particularly suitable for use with the color demodulator of a color television set. The invention also relates to additional circuits which follow the color demodulator and which simplify adjustment of the electron guns of the set for coincident cutoff and for grey tracking.

When a color television set is initially adjusted, it is necessary to adjust its three electron guns so that the colors on the screen do not change when the brightness is adjusted, and so that when a black and white signal is received, the displayed picture will be black and white without color tones. To achieve this, it is necessary to adjust the cutoff of the three guns to be coincident, so that each gun will cut off at the same signal level, to obtain a black background. It is then necessary to adjust the gains of the drive circuits to the cathodes of the guns to achieve grey tracking, so that under brighter conditions, a grey or white picture will be displayed.

The coincident cutoff adjustment is usually made by adjusting the screens of the electron guns, with the vertical scan collapsed and no color signal present, ignoring the condition of the drive circuits connected to the cathodes of the guns (the signals are usually applied to the cathodes of the guns). The grey tracking adjustment is then made by adjusting the gain of the driving amplifiers connected to the cathodes. The difficulty is that the grey tracking adjustment alters the previously adjusted coincident cutoff condition, and vice versa, so that after one adjustment is made, the other must be altered, and this must be repeated several times to achieve an acceptable adjustment. Proper adjustment for coincident cutoff and for grey tracking has therefore been a difficult and time consuming job.

The invention provides novel circuits which simplify the task of adjusting the electron guns in a color television set. In a preferred embodiment, the invention provides a feedback loop in the color demodulator, to maintain the DC quiescent level of the signals being fed to the electron gun drive amplifiers at a fixed level during unblanked intervals. With this DC level accurately known, the conduction of the electron gun drive amplifiers during unblanked intervals is accurately known in the absence of chroma signals. Adjustable tracking resistors are connected to the drive amplifiers to adjust the DC proportions of the black and white or Y signal fed to each drive amplifier, i.e., to adjust the grey tracking. Since the conduction of each drive amplifier during unblanked intervals is accurately known (hence the voltages at all locations in the drive amplifiers are also accurately known), means are provided for establishing a reference voltage which in effect cancels the effects of the tracking resistors when it is desired to adjust the guns for coincident cutoff. Hence the guns can be adjusted for coincident cutoff with the tracking resistors rendered ineffective. The reference voltage is then removed and the tracking resistors are adjusted for grey tracking. Since the two adjustments have no effect on each other, adjustment is greatly simplified.

Further objects and advantages of the invention will appear from the following description, taken together with the accompanying drawings, in which.

Figure 1:
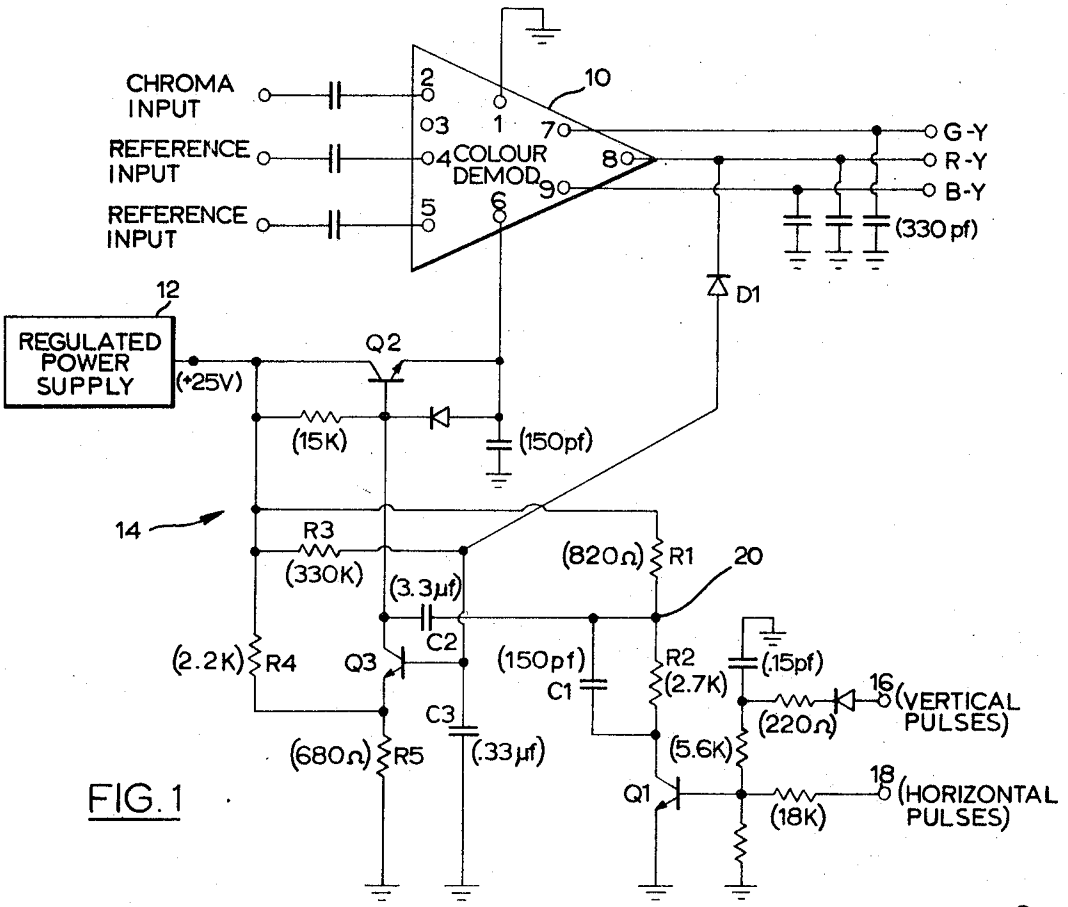
FIG. 1 is a schematic view of a DC level regulating and blanking circuit according to the invention.

In the drawings, typical component values are shown in parenthesis beside the components to which they relate.

Figure 2:
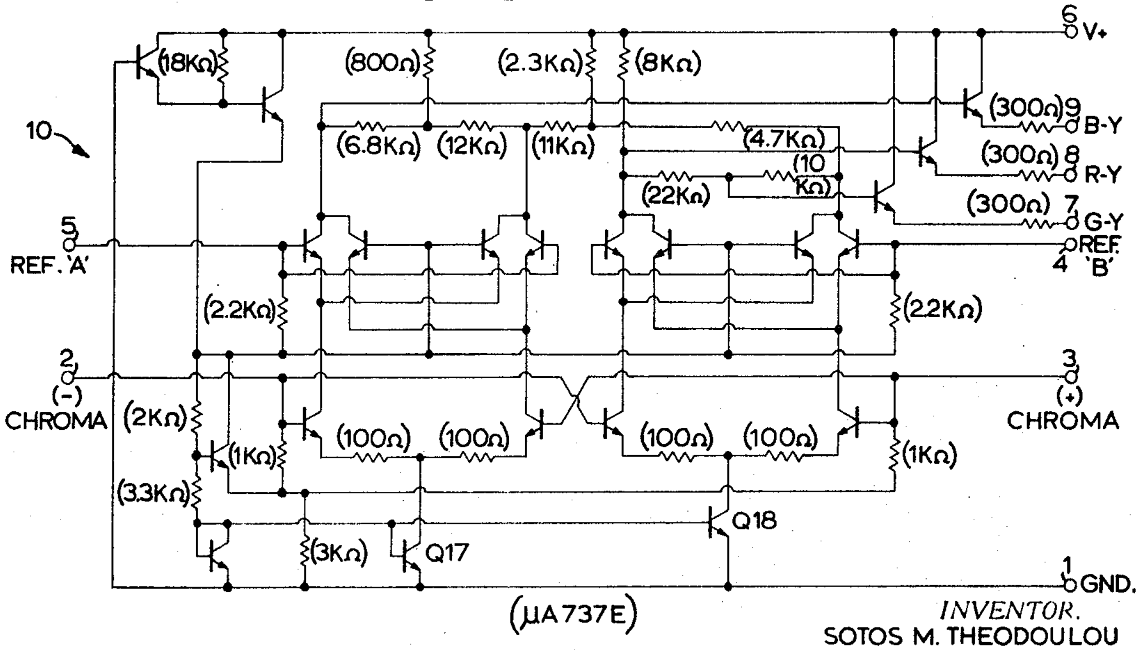
FIG. 2 is a schematic view of a color demodulator of the FIG. 1 circuit.

Referring firstly to FIG. 1, there is shown a color demodulating circuit which includes a color demodulator 10. The color demodulator is typically a linear integrated circuit of the type available from FAIRCHILD SEMICONDUCTOR under the number $\mu$ A737E. The demodulator and the circuit therefor are amply described and illustrated in the 1970 edition of the FAIRCHILD Semiconductor Integrated Circuit Catalogue, at page 6–126. However, for more completeness of description, the circuit of the demodulator 10 is reproduced in FIG. 2, with the pin numbers for the device being indicated at 1 to 9 in the drawings.

The color demodulator 10 receives chroma information at pin 2, phase reference information at pins 4 and 5, and a supply voltage at pin 6. Pin 1 is grounded. Color difference output signals G—Y, R—Y, and B—Y are derived at pins 7, 8 and 9.

According to the invention, an accurately regulated supply voltage (typically +25 volts) is supplied from a power supply 12. The supply voltage is directed through a control circuit generally indicated at 14 and then applied to the pin 6. It will be noted from inspection of FIG. 2 that the supply voltage at pin 6 is DC coupled to the outputs at pins 7, 8 and 9, and in fact the characteristics of the demodulator 10 as shown in the literature are such that the DC voltage at any of the pin outputs varies linearly with the supply voltage at pin 6. Therefore, blanking pulses of predetermined amplitude present in the supply voltage will cause corresponding pulses also of predetermined amplitude (although not necessarily having exactly the same amplitude as the supply voltage pulses) in the outputs at pins 7, 8 and 9.

Accordingly, the control circuit 14 inserts horizontal and vertical blanking pulses in the supply voltage, so that these voltages will appear at pins 7, 8 and 9, to blank the picture tube screen during horizontal and vertical retrace. For this purpose vertical and horizontal pulses are applied to the control circuit 14 at terminals 16, 18 respectively and are applied through resistors to the base of transistor Q1. Transistor Q1 saturates during horizontal or vertical pulses, closing a circuit from the regulated supply 12 through resistors R1, R2 to ground. This creates a known voltage at the junction 20 of resistors R1, R2. The voltage pulse at point 20 (which pulse is sharpened by capacitor C1 in parallel with resistor R2) is applied through capacitor C2 to the base of regulator transistor Q2, reducing the conduction of transistor Q2 by a known amount and thereby superimposing a negative going pulse on the supply voltage at pin 6. As a result, a negative going pulse of predetermined amplitude appears in the outputs at pins 7, 8 and 9.

Although the DC levels at the outputs 7, 8 and 9 will always be closely equal to each other, the tolerances of the demodulator 10 are such that this substantially common DC level can vary considerably from one device to another, even when the same supply voltage in pin 6 is used in all cases. In order to simplify adjustment of the electron guns in the picture tube according to the invention, it is necessary (for reasons to be explained presently) that the DC quiescent levels at pins 7, 8 and 9 be accurately fixed.

Therefore, a feedback loop is provided from one of the output pins back to the regulator transistor Q2. The feedback loop includes diode D1 connected to pin 8 (any of the output pins could be used since the outputs at the three pins are all very close to each other). Diode D1 rectifies the output at pin 8 to establish a voltage across capacitor C3, such voltage being equal to the voltage at the bottom of the blanking pulse from pin 8 minus the drop in diode D1. The anode of diode D1 is positively biased from the regulated supply voltage through resistor R3 so that diode D1 conducts only at the bottom of blanking pulses; at other times, the output voltage at pin 8 (which is positive going) reverse biases diode D1. The relatively long time constant of capacitor C3 and resistor R3 (about 50 milliseconds, compared to the 63.5 microsecond interval between horizontal pulses) ensures that fluctuations in the voltage established across capacitor C3 will not be too rapid.

The voltage established across capacitor C3 is applied to the base of an error transistor Q3, which is referenced through resistors R4, R5 from the regulated supply voltage. The collector of transistor Q3 is connected to the base of the regulator transistor Q2. If the voltage level at the bottom of the blanking pulses at pin 8 varies above or below the desired value, thus causing the voltage on capacitor C3 to be too high or too low, error transistor Q3 conducts more or less to control the supply voltage fed to pin 6 through regulator transistor Q2.

Therefore, in summary at this point, blanking pulses of accurately determined amplitude are applied from point 20 at the junction of resistors R1 and R2 to the base of transistor Q2, and since the conduction of transistor Q1 is accurately determined by the regulated supply voltage, blanking pulses of known size are superimposed on the supply voltage at pin 6. These pulses are reproduced in the outputs at pin 7, 8 and 9, also with a known amplitude, due to the linear characteristics of the demodulator 10. The voltage level at the bottom of the blanking pulses is detected and used (by transistor Q3) to vary the level of the voltage supplied to pin 6 so that the bottom of the pulses at pin 8 is regulated to a predetermined DC level (the value of which is controlled by the values of the components in the feedback circuit). Since the amplitude of the blanking pulses at the output pins 7, 8 and 9 is accurately known, this also has the effect of accurately regulating the quiescent output level in the intervals between blanking pulses; i.e., in the absence of chroma signals, the output during unblanked intervals is a DC voltage of regulated and known value. The circuit therefore accomplishes both blanking and DC level regulation at the same time. The tips of the blanking pulses are used as the reference for the feedback because, when color information is present, the value of the output during intervals between blanking pulses is unknown.

Figure 3:
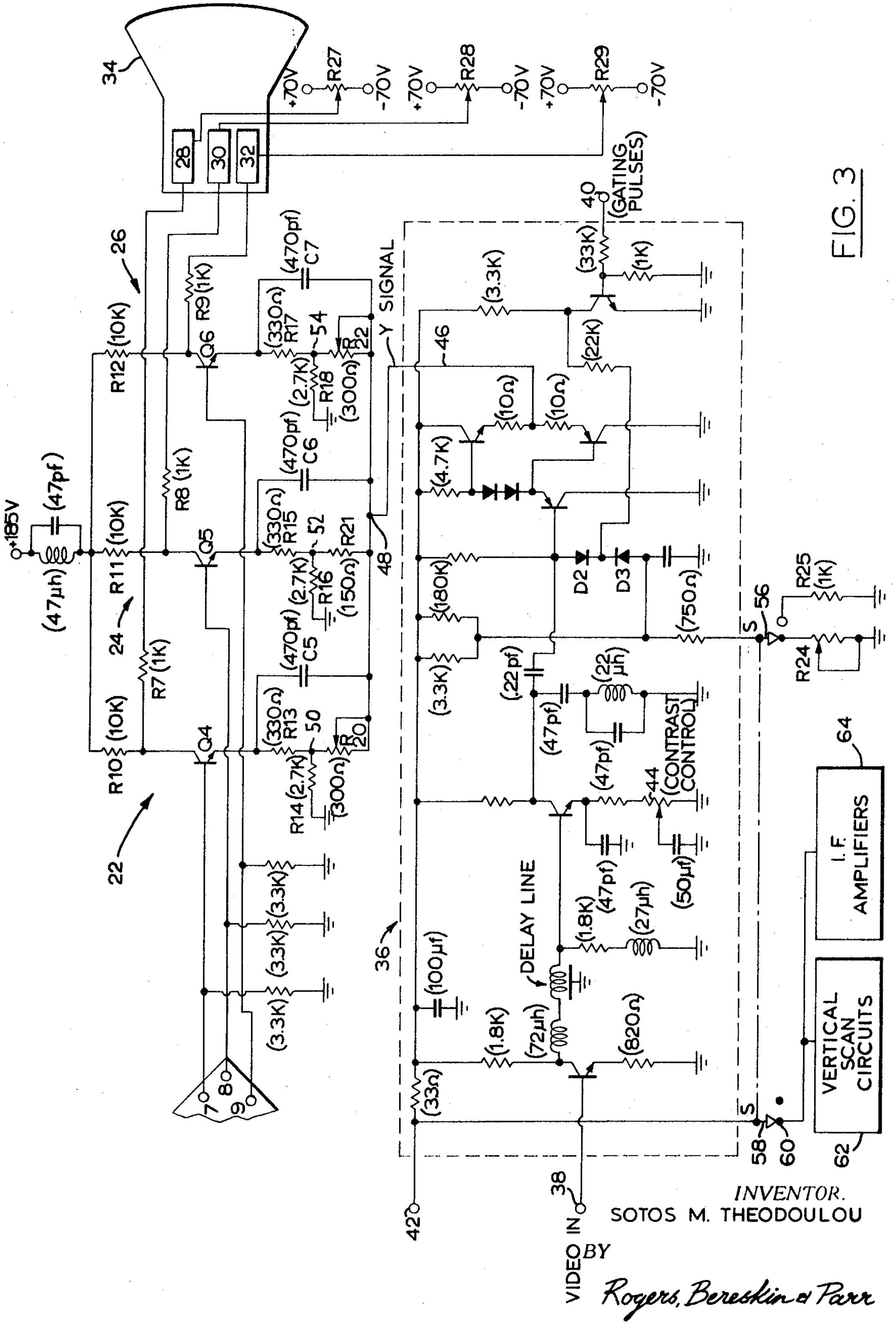
FIG. 3 is a schematic showing drive amplifiers connected between the color demodulator of FIG. 1 and the electron guns of a color television picture tube.

Reference is next made to FIG. 3, which shows three drive amplifiers 22, 2, 26 which include transistors Q4, Q5, Q6 respectively. The inputs of the drive amplifiers, i.e., the bases of transistors Q4, Q5, Q6, are connected to pins 7, 8 and 9 of the color demodulator 10. The outputs of the drive amplifiers, i.e., the collectors of transistors Q4, Q5, Q6, are connected through output resistors R7, R8, R9 to the cathodes (not shown) of the electron guns 28, 30, 32 of a color picture tube 34. The collectors are biased by a supply voltage (typically +185 volts) through collector resistors R10, R11, R12, and the emitters are connected to ground through bias resistors R13 and R14, R15, and R16, and R17 and R18 respectively.

The black and white signal (i.e., the Y signal) is supplied to the drive amplifiers 22, 24, 26 by a conventional DC restored video amplifier generally indicated at 36. The black and white video signal or Y signal is applied to amplifier 36 at input 38; horizontal gating pulses are applied at input 40, with a regulated supply voltage (typically again +25 volts) being applied at input 42. A contrast control 44 varies the amplitude of the signal before it is applied to the DC restorer constituted by diodes D2, D3, and the DC restored, amplified and gated Y signal is applied via lead 46 to the output 48 of amplifier 36.

The output 48 of the amplifier 36 is connected through resistors R20, R21, R22 to points 50, 52, 54 respectively. Point 50 is at the junction of bias resistors R13, R14 for drive amplifier 22 and may be termed the DC level input for amplifier 22. Similarly, point 52 is at the junction of bias resistors R15, R16 for drive amplifier 24 and is the DC level input for this amplifier, while point 54 at the junction of resistors R17, R18 is the DC level input for drive amplifier 26. The DC information in the Y signal is thus injected into the drive amplifiers through resistors R20, R21, R22, which may be termed tracking resistors, for reasons to be explained. Capacitors C5, C6, C7 are high frequency peaking capacitors to flatten the response at high frequencies. The brightness of the picture, which depends on the DC level of the Y signal, is adjusted by a brightness control resistor R24 (typically a 1.5K variable resistor, centered at 1K) which adjusts the DC level at output 48 of amplifier 36.

A service switch S is also provided, for use when the electron guns 28, 30, 32 are to be adjusted for coincident cutoff, as will be described. Switch S is normally biased to the position shown, and when depressed, its contact 56 switches out the brightness control resistor R24 and instead connects a resistor R25 which establishes a predetermined DC voltage level at output 48 of amplifier 36. In addition, another contact 58 of switch S removes the supply voltage from terminal 60. Terminal 60 supplies both the vertical scanning circuits and the IF amplifiers of the set, indicated in block form at 62, 64, so that when switch S is depressed, the vertical scan is collapsed, no video information is received at input terminal 38 of amplifier 36, and no color information appears at the inputs of the drive amplifiers 22, 24, 26.

As previously discussed, when the set is adjusted for use, the electron guns 50, 52, 54 of the picture tube must be adjusted for coincident cutoff and for grey tracking. According to the invention, this procedure is carried out as follows. Firstly, switch S is depressed, establishing a predetermined voltage at output 48 of amplifier 36. The value of resistor R25 is chosen such that this predetermined voltage at point 48 is equal to the voltages at points 50, 52, 54, i.e., at the DC level input of the drive amplifiers during unblanked intervals. This can be done because the voltages at the DC level inputs 50, 52, 54 during unblanked intervals are accurately known under zero chroma signal conditions, because under these conditions, the DC bias at the bases of transistors Q4, Q5, Q6 is known (due to the DC level regulation achieved at pins 7, 8, 9 of the color demodulator 10), and the remaining bias potentials and resistances affecting conduction of Q4, Q5, Q6 are also accurately known.

Since the voltages at each end of the tracking resistors R20, R21, R22 are the same, the tracking resistors are now effectively out of the circuit. The electron guns 28, 30, 32 can now be adjusted for coincident cutoff, without regard for the settings of the tracking resistors. Since the vertical scan is collapsed, only a thin horizontal line will be observed on the screen, and the grid bias resistors R27, R28, R29 of the electron guns are then adjusted so that the line is white and faint. If the line is faint, it will effectively represent black on the screen when the vertical scan is not collapsed. If the grid resistors are adjusted so that the line is white, then all colors have contributed equally and the guns are coincident at this point (which represents black when the vertical scan is not collapsed).

During blanking intervals the DC level at pins 7, 8. 9 and hence the conduction of transistors Q4, Q5, Q6, will shift, so that resistors R20, R21, R22 will not be effectively out of the circuit during blanking intervals. However, the situation during blanking intervals is immaterial, since adjustment is guided only by what is viewed on the screen, and during blanking intervals there is no image on the screen to affect the viewed subject matter.

The switch S is next released, restoring the video information and the vertical scan. The tracking resistors R20, R22 are then adjusted (resistor R21 is not adjustable since only two of the three tracking resistors need be adjusted) to effect grey tracking, i.e., to feed transistors Q4, Q5, Q6 with differing proportions of signal so that the contributions of the guns connected to these transistors will always result in a grey or white picture in the absence of chroma signal. (This adjustment is of course made with only a black and white signal present.) This has no effect on the previously adjusted black level setting, since the cutoff voltage has been arbitrarily selected as the reference voltage at point 48 established by switch S, and when the injected DC level at point 48 reaches this reference voltage, the tracking resistors, however adjusted, will have no effect on the coincident cutoff of the electron guns.

Therefore, the adjustments for coincident cutoff of the electron guns (at "cutoff," the guns are not completely cut off, but with vertical scan present, the screen appears black) and grey tracking are rendered independent, greatly simplifying adjustment. At the same time, the chroma and black and white signals are all DC coupled, providing a better balanced mix of black and white and color information.

Although the DC level regulating and blanking circuit in FIG. 1 has been shown as used with a color demodulator, followed by drive amplifiers to a picture tube, it will be appreciated that the DC level regulating and blanking circuit can be employed in other instances where a DC level must be regulated and pulses applied.

Although blanking pulses have been shown as applied to the color demodulator 10 at its supply voltage input pin 6, the blanking pulses can be supplied to the demodulator at other points. For example, referring to FIG. 2, the circuit could be altered so that the current through transistors Q17, Q18 is modulated with pulses of predetermined amplitude. The output at the tips of the blanking pulses will still be detected and used to control the DC voltage at pin 6 to regulate the DC level during blanking intervals (and hence the DC quiescent level during unblanked intervals) to predetermined values.

If desired, an arrangement can be used in which no blanking pulses at all are applied to the demodulator, and the necessary blanking pulses are all inserted in the Y signal, or at appropriate inputs to amplifiers 22, 24, 26 of FIG. 3. In that case, DC level regulation at pins 7, 8, 9 will still be achieved by regulating during blanking intervals (at which time the signal level is known), in order to obtain regulation of the DC quiescent level during unblanked intervals, and with the DC quiescent level regulated at pins 7, 8, 9, the adjustments for coincident cutoff and grey tracking can be made as before.

What I claim as my invention is:

1. In a television receiver, a DC level regulating and blanking insertion circuit comprising:

a. signal demodulating means for demodulating a modulated signal applied thereto, said signal demodulating means having a modulated signal input, a reference signal input, and a demodulated signal output, and also having a supply voltage input for receipt of a supply voltage, said signal demodulating means including means DC coupling said supply voltage input and said signal output, so that the DC level at said signal output is dependent on the DC level of said supply voltage, and so that blanking pulses in said supply voltage will produce corresponding blanking pulses at said signal output of amplitude dependent on the amplitude of the pulses in said supply voltage, b. means for providing a regulated DC supply voltage, c. control means having voltage control input means for receiving a control signal, said control means being connected in series between said means (b) and said supply voltage input for controlling the magnitude of said supply voltage dependent upon the magnitude of said control signal, d. means connected to said control input means for applying blanking pulses of predetermined amplitude thereto, for producing corresponding blanking pulses of predetermined amplitude at said supply voltage input, thus to produce corresponding blanking pulses of predetermined amplitude at said signal output, e. and means connected between said signal output and said control input means for detecting the DC level at the tips of said blanking pulses at said signal output and for applying a continuous error signal to said control input means to control the magnitude of said regulated DC supply voltage applied to said supply voltage input to maintain the DC level at the tips of said blanking pulses at said signal output at a substantially predetermined value, thereby maintaining the quiescent DC level at said signal output at a substantially fixed value between said blanking pulses.

2. Apparatus according to claim 1 wherein said means (e) includes diode means connected to said signal output, means biasing said diode for conduction only during said blanking pulses, means connected to said diode means for establishing a first DC voltage proportional to the DC voltage level at the tips of said blanking pulses at said signal output, and amplifying means controlled by said first voltage, said amplifying means being connected to said control input means to apply said continuous error signal thereto.

3. Apparatus according to claim 2 wherein said control means comprises a regulator transistor connected in series between said means (b) and said supply voltage input, said control input means being constituted by a control terminal of said regulator transistor.

4. Apparatus according to claim 3 wherein said means for applying blanking pulses of predetermined amplitude to said control terminal comprises:

1. a second transistor,
2. means for supplying blanking pulses to said second transistor,
3. means connecting said second transistor to be normally non-conducting and to saturate when it receives said pulses, said last mentioned means including a resistor-divider network connected in series with said second transistor between said means (b) and ground,
4. and means connecting said resistor-divider network to said control terminal.

5. Apparatus according to claim 1 wherein said television receiver is a color receiver, said signal demodulating means being a color demodulator, said modulated signal input being adapted to receive color signal information, said demodulator having three color outputs, each for a color difference signal, said demodulator including means for maintaining the DC voltage level at each output substantially the same as the DC voltage level at each other output, said signal output being one of said color outputs, said blanking pulses being horizontal and vertical blanking pulses.

6. Apparatus according to claim 5 wherein said color television receiver includes a picture tube having three electron guns, one for each of three colors; said apparatus further including three drive amplifiers, one connected to each of said color outputs, each drive amplifier having an output connected to one of said electron guns, each drive amplifier also having a DC level input; first, second, and third tracking resistors one connected to each of said DC level inputs and each connected to a common terminal, means for supplying a black and white video signal, said common terminal being connected to said means for supplying said black and white signal so that said tracking resistors control the DC level of said black and white signal at said DC level inputs, at least two of said tracking resistors being adjustable;

said drive amplifiers being powered by a fixed DC voltage so that during unblanked intervals and in the absence of any potential applied to said common terminal by said means for supplying said black and white signal, the DC level at said DC level inputs is a predetermined value; and means for establishing a DC reference voltage at said common terminal equal to said predetermined value, thus to render said tracking resistors ineffective, so that said electron guns can be adjusted to coincident cutoff with said tracking resistors ineffective, and said reference voltage can then be removed and said tracking resistors adjusted for grey tracking of said electron guns.

7. Apparatus according to claim 6 wherein each drive amplifier includes a transistor having its base DC connected to one of said color outputs and having its emitter connected through a first bias resistor to a said tracking resistor, and a second bias resistor connected between ground and the junction of said first bias resistor and such tracking resistor.

8. Apparatus according to claim 6 wherein said television set further includes a variable brightness control resistor, and means connecting said brightness control resistor to set the DC level at said common terminal of said tracking resistors; and said means for establishing said reference voltage includes a reference resistor and a service switch, said service switch including contact means for disconnecting said brightness control resistor and for substituting said reference resistor, said television set also including vertical scanning circuits, said service switch further including contact means for disabling said vertical scanning circuits and for removing video signal information from said signal input of said signal processing means.

9. Apparatus according to claim 6 including variable grid resistors biasing said grids, so that adjustment for coincident cutoff may be made by adjusting said variable grid resistors.

10. In a television receiver, a DC level regulating and blanking insertion circuit comprising:

a. signal demodulating means for demodulating a modulated signal applied thereto, said signal demodulating means having a modulated signal input, a reference signal input, and a demodulated signal output, and also having a supply voltage input for receipt of a supply voltage, said signal demodulating means including means DC coupling said supply voltage input and said signal output, so that the DC level at said signal output is dependent on the DC level of said supply voltage, b. said signal demodulating means including blanking pulse input means for receiving blanking pulses, and means coupled to said blanking pulse input means for producing corresponding blanking pulses at said signal output of amplitude dependent on the amplitude of the received blanking pulses, c. means for providing a regulated DC supply voltage, d. control means having voltage control input means for receiving a control signal, said control means being connected in series between said means (c) and said supply voltage input for controlling the magnitude of said supply voltage dependent upon the magnitude of said control signal, e. means connected to said pulse input means for applying blanking pulses of predetermined amplitude thereto, whereby to produce corresponding blanking pulses of predetermined amplitude at said signal output, f. and means connected between said signal output and said control input means for detecting the DC level at the tips of said blanking pulses at said signal output and for applying a continuous error signal to said control input means to control the magnitude of said regulated DC supply voltage applied to said supply voltage input to maintain the DC level at the tips of said blanking pulses at said signal output at a substantially predetermined value, thereby maintaining the quiescent DC level at said signal output at a substantially fixed value between said blanking pulses.

11. A color television receiver having vertical scan means; video signal receiving means, including means for providing a black and white video signal and means for providing color signal receiving means and adapted to receive color signal information therefrom, said demodulator having a plurality of color outputs, each for a color difference signal, means connected to said demodulator for regulating the DC levels at said outputs each at substantially the same predetermined level during unblanked intervals in the absence of said color signal information; said receiver further including a picture tube having a plurality of electron guns, each for a color; said receiver further including a plurality of drive amplifiers, one connected to each of said color outputs, each drive amplifier having an output connected to one of said electron guns, each drive amplifier also having a DC level input; first, second, and third tracking resistors one connected to each of said DC level inputs and each connected to a common terminal, said common terminal being coupled to said means for providing said black and white video signal, so that said tracking resistors control the DC level of said black and white signal at said DC level inputs, at least two of said tracking resistors being adjustable; first switching means operative for switching said vertical scan means and said video signal receiving means to collapse said vertical scan and to remove said color signal information from said demodulator and said black and white video signal from said common terminal; means for energizing said drive amplifiers with a fixed DC voltage so that during unblanked intervals and in the absence of any potential applied to said common terminal by said means for providing said black and white signal, the DC level at said DC level inputs is a predetermined value; second switch means operative for establishing a DC reference voltage at said common terminal equal to said predetermined value, thus to render said tracking resistors ineffective, so that when said first and second switch means are operated, said electron guns can be adjusted to coincident cutoff with said tracking resistors ineffective, and then with said first and second switch means unoperated and with only a black and white video signal supplied to said receiver, said tracking resistors can be adjusted for grey tracking of said electron guns.

* * * * *